July 11, 1967 M. A. AIA 3,330,981
PHOSPHOR COATED ARTICLES
Filed Nov. 14, 1963
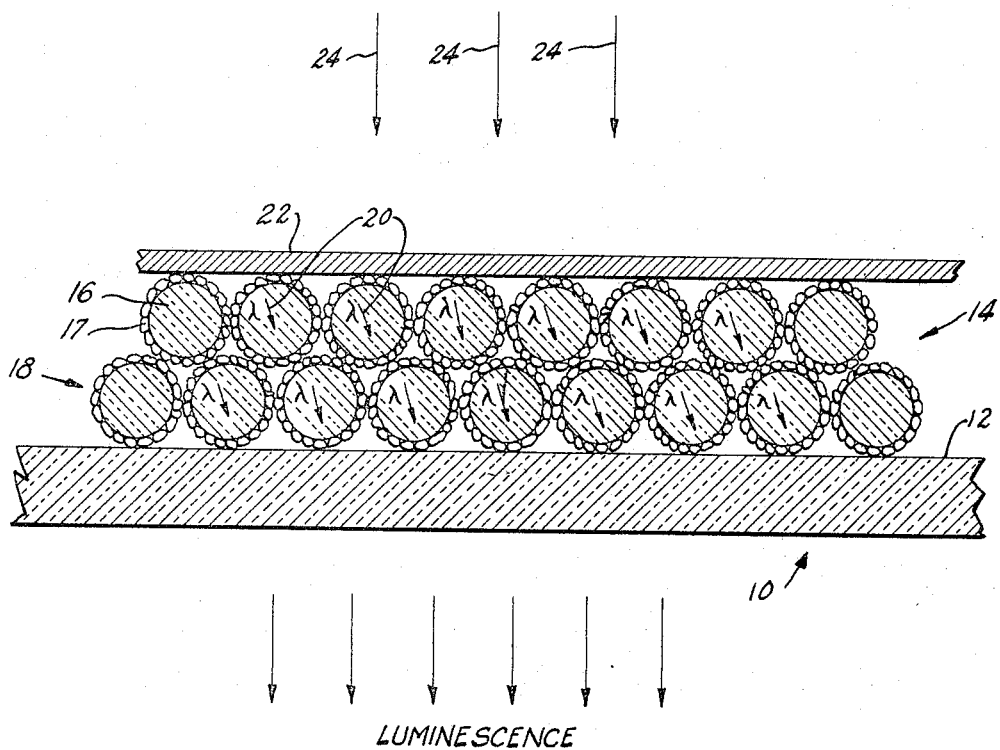
LUMINESCENCE
INVENTOR
Michael A. Aia
BY
ATTORNEY United States Patent Office 3,330,981
Patented July 11, 1967

3,330,981
PHOSPHOR COATED ARTICLES
Michael Alfred Aia, Bayside, N.Y., assignor to Sylvania Electric Products Inc., a corporation of Delaware
Filed Nov. 14, 1963, Ser. No. 323,806
5 Claims. (Cl. 313—92)

This invention relates to energy responsive phosphor articles and more particularly to translucent beads coated with luminescent phosphor particles capable of excitation by the impingement of energy thereupon.

Phosphors may be combined with selected materials known as activators to exhibit luminescence when suitably excited by the proper forms of energy impingement. For certain activated phosphors this energy may be of the radiant type such as X-ray or ultraviolet; while for other phosphor-activator combinations, the appropriate energy form may be electron excitation such as that resultant from the bombardment of the cathodoluminescent screen in a cathode ray tube.

While the subject of this invention is applicable to a variety of phosphor-activator combinations capable of being selectively excited to a state of luminescence by either radiant energy or electron bombardment, for means of illustration electron excitation responsive phosphors will be described in this specification.

Electron excited responsive phosphors, of the types commonly utilized to form the screens of both monochrome and color cathode ray tubes, have crystalline structures exhibiting degrees of light transmission in acordance with the specific phosphor material and the size of the crystal.

The several techniques conventionally used for the deposition of cathodoluminescent screens, i.e. settling, slurrying or dusting sometimes necessitate the use of phosphor particles of larger physical size than required for optimum fluorescence, thus a compromising situation exists between crystal or particle size and brightness. The efficiencies of the several screen forming techniques are related to phosphor particle sizes which are optimum for the specific application.

During bombardment of a phosphor by the electrons of a cathode ray beam, it has been found that the electron and ultraviolet penetration of the phosphor crystal is limited to a shallow shell-like activation when compared with the overall physical dimensions of the crystal; therefore, the fluorescent properties of the bulk of the crystal are not utilized as such. Light attenuation resulting from the reduced light transmission of the larger crystal size reduces the luminescent efficiency of the phosphor.

In addition, the build-up in physical mass of the solid phosphor crystal to an optimum size appropriate for efficient application during the screen forming operation not only increases with the total amount of phosphors used, but is also reflected in added cost of the screen and resultant tube. This is especially true in the case where rare earth oxide phosphor materials are employed.

Accordingly, it is an object of the invention to reduce the aforementioned disadvantages and to provide a phosphor coated article exhibiting increased luminescent efficiency when excited by appropriate energy impingement.

Another object is to effect efficient utilization of smaller size phosphor crystals.

Another object is to provide a phosphor coated article that exhibits enhanced light transmissive capabilities.

A further object is to provide an efficient energy responsive phosphor coated article in sizes optimum for utilization in conventional screen forming techniques.

An additional object is the provision of an energy responsive phosphor article that can be economically produced.

A still further object is to provide an efficient cathodoluminescent screen for a display device employing phosphor coated light transmitting articles.

The foregoing objects are achieved in one aspect of the invention by the provision of individual translucent beads having a coating of cathodoluminescent particles exteriorly disposed thereon to produce an economical phosphor coated article of desired optimum size. Upon electron bombardment, the cathodoluminescent particles are excited to a state of fluorescence. The resultant luminescence readily traverses the translucent bead to produce greater overall transmission of luminescence than is evident from a like size crystalline structure of solid phosphor. Thus a cathode ray screen formed of these phosphor coated translucent beads is capable of producing brighter luminescence than that evidenced from a conventional phosphor screen.

For a better understanding of the present invention, together with other and further objects, advantages and capabilities thereof, reference is made to the following disclosure and appended claims in connection with the accompanying drawing which illustrates a perspective view of one embodiment of the invention.

Referring to the drawing, there is shown a partial screen structure of a cathode ray tube having a transparent glass face portion 10 of which the inner surface 12 has conventionally disposed thereon a cathodoluminescent screen 14 composed of a plurality of phosphor coated translucent beads 18. The deposition of the screen upon the glass may be accomplished by any one of the known screen forming techniques including, settling, slurrying or dusting. Overlaying this cathodoluminescent screen 14, on the side removed from the face portion, there is suitably disposed a reflective layer of electron permeable material 22 such as, for example, vaporized aluminum. Electrons 24, emanating from an electron gun source not shown, penetrate the electron permeable layer 22 and activate the phosphorized beads 18 to produce desired fluorescence.

In greater detail the cathodoluminescent screen 14 is composed of a plurality of translucent beads 16 having an adherent coating of cathodoluminescent phosphor particles 17. The term beads, as used herein, may be defined as substantially uniformly-sized globules of high silica glass or other visible light-transmitting materials of the nature of refractory oxides such as calcined $Al_2O_3$, $ThO_2$, CaO, ZnO, or MgO and may assume various shapes. In this instance, for simplicity, they will be described as being substantially spherical in shape. The term translucent, as used in this specification, may be defined as light transmissive, having either diffusive or nondiffusive properties.

That portion of the luminescent energy 20 emanating from the electron activated phosphor particles 17, that would normally be blocked by the light scattering of a solid crystal phosphor, is permitted to penetrate and traverse the translucent beads 16 to produce increased brightness of luminescence.

The cathodoluminescent phosphor particles 17 are of the types commonly used in monochrome and color cathode ray tubes. The particles 17 are smaller in size than the beads 16 upon which they are adhered.

As a specific example of this invention, rare earth oxide phosphors adheringly disposed upon the exterior of glass beads, of a size suitable for use in a screen forming process, will be considered.

The rare earth oxide phosphors such as oxides of yttrium, gadolinium, lutetium, scandium and lanthanum activated by other rare earth ions, for example, europium, terbium, samarium, praseodymium, erbium, dysprosium, holmium, or thulium normally comprise small sized crystals difficult to advantageously utilize in some of the conventional screen forming processes. However, these minute crystals or particles, which approximate less than one to several microns in size, exhibit superior coverage and can produce significantly bright luminescence when excited to a state of fluorescence by electron bombardment.

Through experimentation it has been discovered that the efficiency of the rare earth oxide phosphor particles of small size can be much more efficiently utilized in a cathodoluminescent coating adheringly disposed upon the exterior of a vehicular material such as translucent beads. Thus a variety of sizes of phosphor coated articles or beads may be produced to meet the respective optimum sizing requirements for the several conventional screen forming processes. The translucent beads are preferably of a leadless type glass of substantially uniform size per requirement. The composition of the glass should be low in impurities known to interfere with luminescence. As has been previously mentioned, electron excitation of phosphor crystals is a reaction predominantly confined to the exterior portion of each individual crystal; therefore, excitation of the phosphor coating on the beads produces fluorescence and resultant luminescence that is equal to that produced on the exterior of a like size all-phosphor crystal, but the coated bead has much greater luminescent efficiency since it is translucent. In general, glass beads are more economical than similar size masses of phosphor, therefore, coated beads represent a tremendous cost advantage over the solid phosphors; this is particularly true with reference to phosphors containing costly rare earth materials.

It has been found that the cathodoluminescent phosphor coated beads having a size range of eight to sixteen microns are preferably selected for certain types of screening processes, such as, for example, the dusting or dry powder technique shown and described in Patent No. 3,025,161 and entitled, "Method of Forming Patterns," by Thaddeus V. Rychlewski.

To achieve the above-mentioned overall size, uniformly-sized beads, selected within the range of four to twelve microns, are pre-etched and then disposed for heating in the presence of a cathodoluminescent phosphor to achieve a tacky exterior, whereupon the cathodoluminescent particles or crystals, having a size within the range of one-half to two microns, are bondingly adhered thereto to form the desired overall coated bead size ranging from eight to sixteen microns. The phosphor particles forming a contiguous peripheral coating on the individual beads are preferably in contact with adjacent particles but slight voids may be existent without materially reducing the fluorescent intensity.

The electron bombardment excites the cathodoluminescent coating to a state of fluorescence so that the luminescence therefrom will penetrate into and through the translucent bead, thereby producing an enhanced luminescence of increased brightness. Thus, the relatively large-size coated beads exhibit much of the luminescent efficiency inherent in the more minute phosphor crystals.

In this manner the smaller size rare earth oxide phosphors may be effectively utilized in an economical manner to produce optimum sized phosphor coated articles whereby, a cathodoluminescent cathode ray tube screen of increased luminescent efficiency can be advantageously achieved.

While use of the rare earth oxide phosphors has been described, the invention is not restricted to this usage. It is equally applicable to any type of cathodoluminescent phosphors and to any means for screening in both monochrome and color cathode ray tube applications.

Furthermore, translucent beads of the type heretofore described may be singularly coated with appropriately activated phosphor particles that are responsive to excitation by X-rays or ultraviolet radiation. As such, phosphor coated articles of this nature may be suitably utilized in X-ray intensifying screens, fluorescent lamps and other luminescent display devices.

While there has been shown and described what is at present considered the preferred embodiment of the invention, it will be obvious to those skilled in the art that various changes and modifications may be made therein without departing from the scope of the invention as defined by the appended claims.

What is claimed is:

1. Energy responsive phosphor coated articles comprising:
   translucent beads of substantially uniform size; and
   phosphor particles, of substantially smaller size than said translucent beads, adheringly disposed in a bonded manner upon the exterior of said beads to provide individually thereon a substantially continuous and contiguous peripheral coating of luminescent material.

2. A cathode ray tube having an electron beam source and a substantially transparent viewing area comprising:
   a homogeny of size-related beads adheringly disposed on the inner surface of said viewing area to provide thereon a beaded layer of substantially uniform thickness, said beads singularly formed of a substantially translucent material individually encased with an exteriorly adhered coating of bonded cathodoluminescent material, said coating comprising a plurality of electron responsive phosphor particles of substantially smaller size than said beads to provide cathodoluminescence to said beads when impinged by said electron beam, said cathodoluminescent coating being of a thickness and uniformity to provide optimum luminescence to said beads.

3. Electron responsive phosphor coated articles of the type utilized in forming cathode ray tube screens comprising:
   translucent glass beads having etched exteriors and substantially uniformity of size; and
   cathodoluminescent phosphor particles of substantially smaller size than said translucent beads, said particles being adheringly disposed in a bonded manner upon said etched exterior of said beads to form individually thereon a substantially continuous and contiguous peripheral coating of cathodoluminescent material having a thickness and uniformity to promote optimum luminescence; said bead and said phosphor coating forming an overall coated bead of size to provide phosphor coated articles having a size range optimum for utilization in cathode ray tube screen forming processes.

4. Electron responsive phosphor coated articles according to claim 3 wherein said translucent beads are of a size selected from a range of four to twelve microns, and wherein said phosphor particles are of a size selected from a range of one-half to two microns, and wherein said coated bead ranges from substantially eight to sixteen microns in overall size.

5. Energy responsive phosphor coated articles according to claim 1 wherein said exteriors of said beads are substantially etched surfaces.

References Cited
UNITED STATES PATENTS

| | | | |
|---|---|---|---|
| 2,137,118 | 11/1938 | Schleede et al. | 313—92 |
| 2,289,978 | 7/1942 | Malter | 313—92 |
| 2,567,714 | 9/1951 | Kaplan | 313—92 |
| 3,253,146 | 5/1966 | De Vries | 250—71 |

JAMES W. LAWRENCE, *Primary Examiner.*

V. LAFRANCHI, *Assistant Examiner.*

Notice of Adverse Decision in Interference

In Interference No. 97,005 involving Patent No. 3,330,981, M. A. Aia, PHOSPHOR COATED ARTICLES, final judgment adverse to the patentee was rendered Nov. 17, 1971, as to claim 1.

[*Official Gazette July 4, 1972.*]